Sept. 25, 1923.

C. E. JACKSON

POULTRY COOP

Filed Feb. 7, 1923

1,468,815

C. E. Jackson,
Inventor

By [signature]
Attorneys

Patented Sept. 25, 1923.

1,468,815

UNITED STATES PATENT OFFICE.

CHESTER E. JACKSON, OF OVID, MICHIGAN.

POULTRY COOP.

Application filed February 7, 1923. Serial No. 617,549.

*To all whom it may concern:*

Be it known that I, CHESTER E. JACKSON, a citizen of the United States, residing at Ovid, in the county of Clinton and State of Michigan, have invented a new and useful Poultry Coop, of which the following is a specification.

This invention relates to poultry coops, and more particularly to coops for confining poultry during the incubating period to break them from sitting.

The object of the invention is to provide a coop of this character so constructed that the incubating heat of the fowl will be cooled in a comparatively short time, and which is thoroughly sanitary and comfortable.

Another object of the invention is to provide a coop of this character with a combined closure and partition so constructed that when the partition is removed, the closure will be opened and vice versa.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing:—

Figure 1:
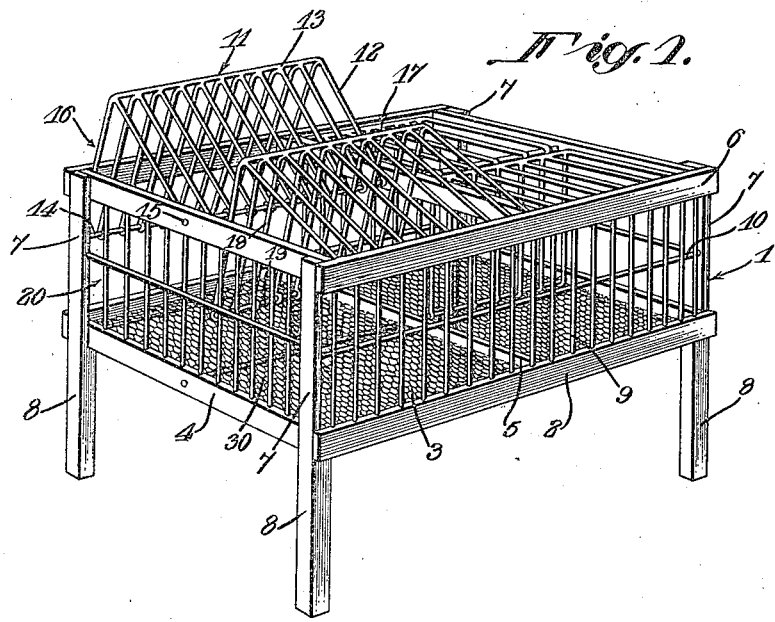
Figure 2:
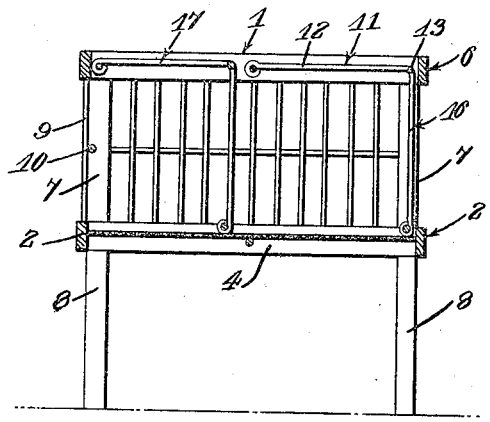

Figure 1 represents a perspective view of a coop constructed in accordance with this invention with two of the combined partitions of the closures arranged in open position, and Fig. 2 is a transverse section with the covers in closed position.

In the embodiment illustrated, the coop constituting this invention comprises a skeleton or open frame 1 consisting of a rectangular bottom member 2 covered by wire mesh 3 which is reinforced by cross braces 4 and 5 extending in planes at right angles to each other and attached respectively to the end and side members of the frame.

The top member 6 is spaced a suitable distance above the member 2 and connected therewith by uprights 7 which are arranged at the corners of the frame and merge at their lower ends into legs 8 for supporting the coop above the ground so as to permit a free circulation of air thereunder and permit it to pass up through the wire mesh 3 into the coop. The top member 6 is also rectangular in form.

The side and end walls of this coop are formed by a plurality of laterally spaced upright wire rods 9, any desired number of which may be employed arranged sufficiently close to prevent the confined fowl from squeezing out. Reinforcing longitudinally disposed rods 10 are arranged midway the height of these rods and secured at their ends to the corner posts.

The coop herein shown is divided into four compartments or chambers, although obviously, any desired number may be employed according to the size of the coop and the compartments to be formed. The partitions for the compartments are formed as a portion of the closure for said compartment 20, each of which comprises a substantially L-shaped member 11 composed of a plurality of spaced rods 12 connected at their bends by a longitudinal rod 13 and at their ends by rods 14 and 15, the rod 15 being mounted longitudinally in the top member 6 of the frame and the rods 12 having eyes at their ends hingedly engaged with said rod so that when the member 11 is swung into position shown in Fig. 1, the front portion 16 thereof will be raised to open the compartment 20 in connection with which it is used to permit poultry to be inserted in said compartment 20 or released The combined partition and closure 17 which is used in connection with compartment 30 which is arranged adjacent to compartment 20 is hingedly connected to the side member of the top frame portion 6, said member 17 being composed of connected wires similar to the member 11, the free ends of said wires being connected by a cross wire 18. The portions of the wires 19 which are connected with the wires 18 extend in a plane at right angles to those 19′ and form when the member 17 is in lowered position, a partition separating the compartments 20 and 30 from each other.

It will thus be seen that the combined closures and partitions for the various compartments when opened will either bring two of the adjacent compartments into communication with each other and permit the confined fowl to pass from one compartment to the other or to release them from the coop as shown clearly in Fig. 1.

The construction of the coop in the manner above set forth permits free circulation of air in all directions therethrough so that the fowl which is confined to break it from sitting has its incubating heat quickly cooled, say in forty-eight hours, which is a comparatively short time.

Various changes in the form, shape, proportion and other minor details of construction may be made without departing from the principle or sacrificing any of the advantages of the claimed invention.

I claim:—

1. A coop of the class described comprising a skeleton frame having foraminous sides, top and bottom, and a member hinged in one wall and adapted to form simultaneously a combined closure and partition.

2. A coop of the class described comprising a housing having an opening, and a member hingedly mounted to swing into the housing and to simultaneously form a closure for said opening and a partition in the housing.

3. A coop of the class described comprising a housing having an opening, and a right angular member hingedly connected at one end in position to cause its other end to swing into said housing and form a partition within the housing.

4. A coop of the class described comprising a skeleton frame having a foraminous covering arranged thereover, a plurality of L-shaped members hingedly connected at one end to the top of said structure one of which is designed to extend into the frame, and a closure for the compartment formed by said partition.

In testimony that I claim the foregoing as my own, I have hereto affixed my signature in the presence of two witnesses.

CHESTER E. JACKSON.

Witnesses:
F. A. MARSHALL,
R. J. BARRUS.